US007428896B2

(12) United States Patent
Eriksson et al.

(10) Patent No.: US 7,428,896 B2
(45) Date of Patent: Sep. 30, 2008

(54) METHOD AND APPARATUS FOR USE IN ENHANCING FUELS

(75) Inventors: Johannes Eriksson, San Diego, CA (US); Erik Ulsteen, San Diego, CA (US)

(73) Assignee: Emission & Power Solutions, Inc., Carlsbad, CA (US)

( * ) Notice: Subject to any disclaimer, the term of this patent is extended or adjusted under 35 U.S.C. 154(b) by 0 days.

(21) Appl. No.: 11/140,507

(22) Filed: May 27, 2005

(65) Prior Publication Data

US 2005/0284453 A1 Dec. 29, 2005

Related U.S. Application Data

(60) Provisional application No. 60/667,720, filed on Apr. 1, 2005, provisional application No. 60/663,553, filed on Mar. 18, 2005, provisional application No. 60/582,514, filed on Jun. 24, 2004, provisional application No. 60/582,419, filed on Jun. 24, 2004.

(51) Int. Cl.
*B01J 19/08* (2006.01)

(52) U.S. Cl. ...................................................... 123/538

(58) Field of Classification Search .......... 123/536–538
See application file for complete search history.

(56) References Cited

U.S. PATENT DOCUMENTS

| | | | |
|---|---|---|---|
| 3,616,375 | A | 10/1971 | Inoue |
| 3,764,008 | A | 10/1973 | Darley et al. |
| 3,996,012 | A | 12/1976 | Zucker |
| 4,009,095 | A | 2/1977 | Carson |
| 4,282,100 | A | 8/1981 | Kunishio et al. |
| 4,332,667 | A | 6/1982 | Epperly et al. |
| 4,356,078 | A | 10/1982 | Heavin et al. |
| 4,358,373 | A | 11/1982 | Jubenville |
| 4,369,100 | A | 1/1983 | Sawyer |
| 4,421,629 | A | 12/1983 | York et al. |
| 4,443,322 | A | 4/1984 | Jubenville |

(Continued)

FOREIGN PATENT DOCUMENTS

| | | |
|---|---|---|
| CA | 2211561 | 8/1996 |

(Continued)

OTHER PUBLICATIONS

Kidwell-Ross, "Engine Damage From Low Sulphur Diesel Fuel", American Sweeper, Oct. 3, 2002, 3 pages, vol. 3, No. 1.

(Continued)

*Primary Examiner*—M. McMahon
(74) *Attorney, Agent, or Firm*—Fitch Even Tabin & Flannery

(57) ABSTRACT

The present embodiments provide methods and apparatuses for use in enhancing and/or treating fluids, such as fuels. Some embodiments provide apparatuses for use in treating fuel that comprise a first conduit having an input end, an output end, and a metallic interior surface; a second conduit positioned within and axially aligned with the first conduit, the second conduit having first and second ends, and a plurality of holes distributed along at least a portion of a length of the second conduit; and a treatment control bypass affixed with the second conduit configured to control an amount of fluid flow exiting the second conduit through the plurality of holes distributed along the portion of the length of the second conduit.

16 Claims, 9 Drawing Sheets

U.S. PATENT DOCUMENTS

| | | | | |
|---|---|---|---|---|
| 4,488,866 | A | | 12/1984 | Schirmer et al. |
| 4,492,674 | A | | 1/1985 | Schweighardt |
| 4,561,953 | A | | 12/1985 | Muralidhara et al. |
| 4,639,309 | A | | 1/1987 | Lalancette et al. |
| 4,715,325 | A | | 12/1987 | Walker |
| 4,747,920 | A | | 5/1988 | Muralidhara et al. |
| 4,765,885 | A | | 8/1988 | Sadeghi et al. |
| 4,810,359 | A | | 3/1989 | Sayles |
| 4,820,422 | A | | 4/1989 | Spencer |
| 4,891,131 | A | | 1/1990 | Sadeghi et al. |
| 4,930,483 | A | | 6/1990 | Jones |
| 4,931,171 | A | | 6/1990 | Piotter |
| 5,017,281 | A | | 5/1991 | Sadeghi et al. |
| 5,019,219 | A | | 5/1991 | Hamer et al. |
| 5,048,499 | A | | 9/1991 | Daywalt |
| 5,062,944 | A | | 11/1991 | Lieb et al. |
| 5,098,553 | A | | 3/1992 | Sapre |
| 5,110,443 | A | | 5/1992 | Gregoli et al. |
| 5,120,428 | A | | 6/1992 | Ikura et al. |
| 5,167,782 | A | | 12/1992 | Marlow |
| 5,197,446 | A | | 3/1993 | Daywalt et al. |
| 5,198,122 | A | | 3/1993 | Koszalka et al. |
| 5,209,879 | A | | 5/1993 | Redding, Jr. |
| 5,213,619 | A | | 5/1993 | Jackson et al. |
| 5,254,177 | A | | 10/1993 | Chauvin |
| 5,307,779 | A | * | 5/1994 | Wood et al. ................. 123/538 |
| 5,314,613 | A | | 5/1994 | Russo |
| 5,403,475 | A | | 4/1995 | Allen |
| 5,423,979 | A | | 6/1995 | Allen |
| 5,470,458 | A | | 11/1995 | Ripley et al. |
| 5,472,620 | A | | 12/1995 | Huang |
| 5,482,629 | A | | 1/1996 | Rippetoe et al. |
| 5,485,883 | A | | 1/1996 | Rippetoe et al. |
| 5,494,585 | A | | 2/1996 | Cox |
| 5,538,081 | A | | 7/1996 | Rippetoe et al. |
| 5,547,563 | A | | 8/1996 | Stowe |
| 5,554,301 | A | | 9/1996 | Rippetoe et al. |
| 5,584,969 | A | | 12/1996 | Nagai et al. |
| 5,679,236 | A | | 10/1997 | Poschl |
| 5,690,811 | A | | 11/1997 | Davis et al. |
| 5,824,214 | A | | 10/1998 | Paul et al. |
| 5,881,702 | A | * | 3/1999 | Arkfeld ...................... 123/538 |
| 5,914,027 | A | | 6/1999 | Ellingsen |
| 5,969,207 | A | | 10/1999 | Kozyuk |
| 6,019,947 | A | | 2/2000 | Kucherov |
| 6,036,849 | A | | 3/2000 | Rippetoe et al. |
| 6,074,549 | A | | 6/2000 | Bacon Cochrane et al. |
| 6,106,699 | A | | 8/2000 | MacDonald et al. |
| 6,106,787 | A | | 8/2000 | Rippetoe et al. |
| 6,110,359 | A | | 8/2000 | Davis et al. |
| 6,142,127 | A | * | 11/2000 | Maass ........................ 123/514 |
| 6,171,476 | B1 | | 1/2001 | Draemel et al. |
| 6,190,538 | B1 | | 2/2001 | Gosselink et al. |
| 6,402,939 | B1 | | 6/2002 | Yen et al. |
| 6,405,719 | B2 | * | 6/2002 | Nozato ....................... 123/538 |
| 6,446,612 | B1 | * | 9/2002 | Hankins et al. ............. 123/514 |
| 6,454,936 | B1 | | 9/2002 | Varadaraj |
| 6,527,960 | B1 | | 3/2003 | Bacon et al. |
| 6,544,411 | B2 | | 4/2003 | Varadaraj |
| 6,555,009 | B2 | | 4/2003 | Varadaraj |
| 6,627,784 | B2 | | 9/2003 | Hudson et al. |
| 2002/0005346 | A1 | | 1/2002 | Babington |
| 2002/0043478 | A1 | | 4/2002 | Draemel et al. |
| 2002/0125174 | A1 | | 9/2002 | Varadaraj |
| 2002/0164274 | A1 | | 11/2002 | Haggett et al. |
| 2003/0019791 | A1 | | 1/2003 | Austin |
| 2003/0042174 | A1 | | 3/2003 | Austin |
| 2003/0051989 | A1 | | 3/2003 | Austin |
| 2003/0102251 | A1 | | 6/2003 | Draemel et al. |
| 2003/0102255 | A1 | | 6/2003 | Mahajan |
| 2003/0132139 | A1 | | 7/2003 | Varadaraj |

FOREIGN PATENT DOCUMENTS

| | | |
|---|---|---|
| CA | 2222842 | 1/1997 |
| DE | 4107708 | 9/1992 |
| JP | 59102988 | 12/1982 |
| JP | 60223893 | 4/1984 |
| JP | 60226594 | 4/1984 |
| JP | 6384633 | 9/1986 |
| WO | 9622946 | 8/1996 |
| WO | 9702404 | 1/1997 |

OTHER PUBLICATIONS

Katz et al., Cavitation and Multiphase Flow, 1995, vol. 210, The American Society of Mechanical Engineers, New York, NY.

Patent Cooperation Treaty, "International Preliminary Report on Patentability," for corresponding PCT Application No. PCT/US2005/022868, dated Apr. 5, 2007, 5 pages.

United States Patent and Trademark Office, "Office Action," for corresponding U.S. Appl. No. 11/140,474, dated Jun. 27, 2007, 6 pages.

* cited by examiner

METHOD AND APPARATUS FOR USE IN ENHANCING FUELS

PRIORITY CLAIM

This application claims the benefit of U.S. Provisional Application Nos. 60/663,553, filed Mar. 18, 2005, entitled METHOD AND APPARATUS FOR USE IN ENHANCING FUELS; 60/667,720, filed Apr. 1, 2005, entitled METHOD, APPARATUS AND SYSTEM FOR USE IN ENHANCING FUELS; 60/582,419, FILED Jun. 24, 2004, entitled METHOD AND APPARATUS FOR THE ENHANCEMENTS OF DIESEL FUELS; and 60/582,514, filed Jun. 24, 2004, entitled METHOD AND APPARATUS FOR THE ENHANCEMENTS FOR GASOLINE, all of which are incorporated herein by reference in their entirety.

FIELD OF THE INVENTION

The present invention relates generally to the treatment of fuels, and more particularly to the enhancement of fuels.

BACKGROUND

The number of combustion engines in use today is in excess of hundreds of millions of engines. These combustion engines typically operate through the ignition and combustion of fuels such as fossil fuels. Many of the vehicles use gasoline and/or diesel fuel.

Diesel, gasoline and other relevant fuels, however, typically are not fully consumed or burned upon ignition of the fuel. As a result, some of the fuel, and often a significant percentage of the fuel is wasted and expelled as exhaust. This results in large amounts of emissions and lower fuel efficiency.

The accumulated effect of the large amounts of emissions from the millions of combustion engines accounts for a significant portion of today's air pollution. Further, because of the lower efficiency, the cost for operating these engines can be high and in some instances inhibitively high. Still further, the lower efficiency causes greater fuel consumption that can lead to a dependence on sources of fuel.

SUMMARY OF THE EMBODIMENT

The present invention advantageously addresses the needs above as well as other needs through the provision of the method, apparatus, and system for use in enhancing fuels. Some embodiments provide apparatuses for use in treating fuel. These apparatuses can include a first conduit having an input end, an output end, and a metallic interior surface; a second conduit positioned within and axially aligned with the first conduit, the second conduit having first and second ends, and a plurality of holes distributed along at least a portion of a length of the second conduit; and a treatment control bypass affixed with the second conduit configured to control an amount of fluid flow exiting the second conduit through the plurality of holes distributed along the portion of the length of the second conduit.

Other embodiments include methods for use in treating fuel. The methods are configured to deliver a fluid under pressure to a first conduit; forcing a first portion of the fluid out of the first conduit through a plurality apertures distributed along a length of the first conduit forming streams of fluid; cause the streams of fluid to impact an interior metallic wall of a second conduit that is axially aligned with and positioned about the first conduit treating the fluid to alter physical characteristics of the first portion of the fluid; and control the treating of the fluid including directing a second portion of the fluid out of the first conduit bypassing the plurality of distributed apertures.

Some embodiments further provide apparatuses for use in treating fuel. These apparatuses include a reactor cartridge assembly that further comprise an outer conduit having an input end, an output end, a metallic interior surface; and an inner conduit having a first end, a second end, a plurality of apertures distributed along a length of the inner conduit and a diameter that is less than a diameter of the outer conduit where the inner conduit is positioned within and axially aligned with the outer tube such that at least a portion of a fluid delivered to the inner conduit induces a first phase of cavitation upon dispersing the fluid through the plurality of holes to impact the metallic interior surface of the outer conduit. The apparatuses further include a biasing member positioned proximate the reactor cartridge assembly such that the biasing member maintains a positioning of the reactor cartridge assembly; and a first vortex positioned relative to reaction cartridge assembly causing a second phase of cavitation.

Some embodiments provide apparatuses for use in enhancing fuel. These apparatuses include an exterior conduit, an input and an output cooperate with opposite sides of the exterior conduit through which fuel enters and exits respectively, a reaction cartridge assembly positioned within the exterior conduit to receive and at least induce cavitation of the fuel and outputting cavitated fuel, and biasing member positioned within the exterior conduit and cooperated with the reaction cartridge assembly to maintain a positioning of the reaction cartridge assembly.

A better understanding of the features and advantages of the present invention will be obtained by reference to the following detailed description of the invention and accompanying drawings which set forth an illustrative embodiment in which the principles of the invention are utilized.

BRIEF DESCRIPTION OF THE DRAWINGS

The above and other aspects, features and advantages of the present invention will be more apparent from the following more particular description thereof, presented in conjunction with the following drawings wherein.

Figure 1:
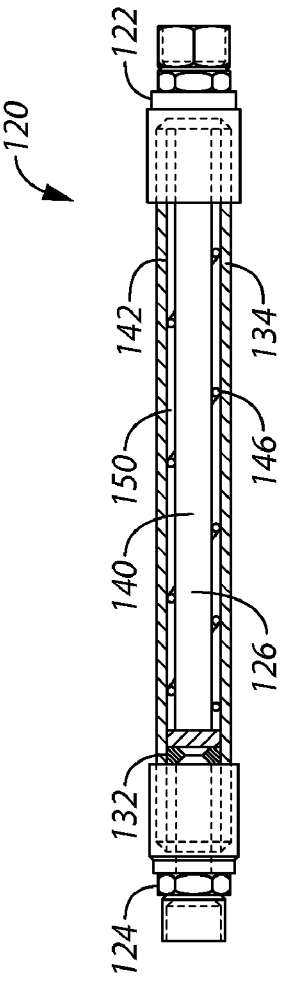
FIG. 1 depicts a simplified cross-sectional view of a fluid enhancement system according to some embodiments.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention.

DETAILED DESCRIPTION

The present embodiments provide for methods and apparatuses for use in the enhancement of fluids, such as gasoline, diesel fuel, and other fluids, wherein the fluids are subjected to multi-phase cavitation and exposure to a catalyst to change the physical characteristics and properties of fluids, such as gasoline to improve and enhance their effectiveness for combustion. In some implementations the enhancing systems operate as on-board fuel treatment center for engines.

Cavitation is a process of bubble formation and collapse within a fluid. When the pressure in a flow field decreases below a vapor pressure of the fluid, some of the fluid vaporizes creating one or more bubbles. If the local pressure later increases above the vapor pressure, the bubble collapses. When the bubble collapse is rapid, the collapse takes place adiabatically and can produce relatively tremendous temperatures and pressures that can cause one or more chemical reactions to occur. Among the chemical reactions is a cracking of relatively long hydrocarbon chains into shorter chains and an increase in the vapor pressure that improves combustion. The present embodiments, at least in part, effectively employ multi-phase cavitation to treat fluids.

FIG. 1 depicts a simplified cross sectional view of a fuel enhancement system 120 according to some embodiments. The system 120 has an input coupling adaptor 122, an output coupling adaptor 124, a reaction cartridge assembly 126, one or more vortexes 132, and an exterior sheath conduit 134. The reaction cartridge assembly 126 includes an inner or flutelike conduit 140, an outer conduit 142, and a spacer 146 with a gap or passage 150 established between the inner conduit 140 and outer conduit 142. The exterior sheath 134 is positioned between the input 122 and output 124, with the reaction cartridge assembly 126 and vortex 132 sealed within the sheath 134. In operation, one or more fluids, such as a fuel, is supplied to the enhancement system 120 and is maintained within the exterior sheath 134 to flow through the reaction cartridge assembly 144 and through the vortex during treatment. The system 120 is shown with the vortex 132 positioned proximate the output 124. In some embodiments an alternative and/or additional vortex is positioned proximate the input 122 prior to the reaction cartridge assembly 126 to induce initial agitation, turbulence and/or an initial phase of cavitation.

Figure 2:
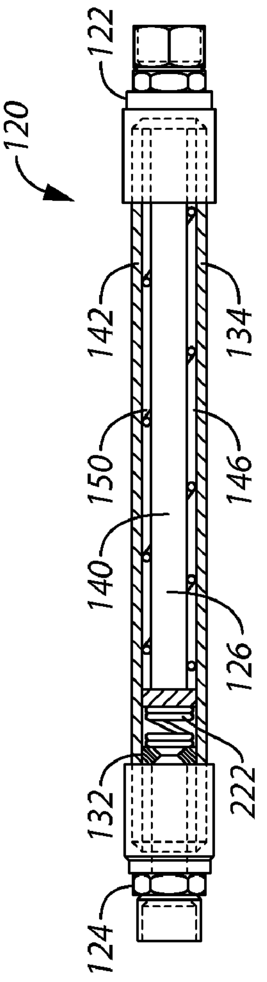
FIG. 2 depicts a simplified cross sectional view of an alternative fuel enhancement system according to some embodiments.

FIG. 2 depicts a simplified cross sectional view of an alternative fuel enhancement system 120 according to some embodiments. The system 120 includes an input coupling adaptor 122, an output coupling adaptor 124, a reaction cartridge assembly 126, one or more vortexes 132, an exterior sheath conduit 134, and further includes a biasing member 222. Similar to the system 120 of FIG. 1, the reaction cartridge assembly 126 includes an inner conduit 140, an outer conduit 142, and a spacer 146 with a gap or passage 150 established between the inner conduit 140 and outer conduit 142. The exterior sheath 134 is positioned between the input 122 and output 124, with the reaction cartridge assembly 126 and vortex 132 sealed within the sheath 134. The biasing member 222 is positioned between the reaction cartridge assembly 126 and the vortex 132, and in part, maintains positioning of the reaction cartridge assembly at least relative to the input coupling adaptor 122.

It is typical for fuel to be incompletely burned in a combustion engine. The un-ignited portions are then expelled as exhaust. The failure to ignite portions of the fuel can result, in part from a failure to adequately vaporize the fuel due for example to the existence of long carbon chains. The present methods and apparatuses are utilized to enhance fuel, such as diesel and/or gasoline, to improve at least in part the combustible characteristics of the fuel.

Referring to FIGS. 1 and 2, the systems 120 create changes in pressure and generate turbulence to establish an environment for multi-phase cavitation to occur. After and/or during cavitation the fuel is exposed to a catalyst material, such as copper, nickel, aluminum, copper alloy, and other relevant catalyst materials and/or combinations of materials, that relatively freely give off electrons that thereby impart an electrical/magnetic charge on the fluid being treated The creation of turbulence aids in the processing of the fluid. The turbulence can be introduced at least in part through the configuration of the inner conduit 140. The fluid passes through a plurality of holes 426 (see FIG. 4) distributed over a portion of the length of the inner conduit and is exposed to an inner surface of the outer tube 142 that in some implementations includes a catalyst material as fully described below. Additionally, the spirally wound spacer 146 can be configured to further enhance the turbulence within the fluid.

Figure 3:
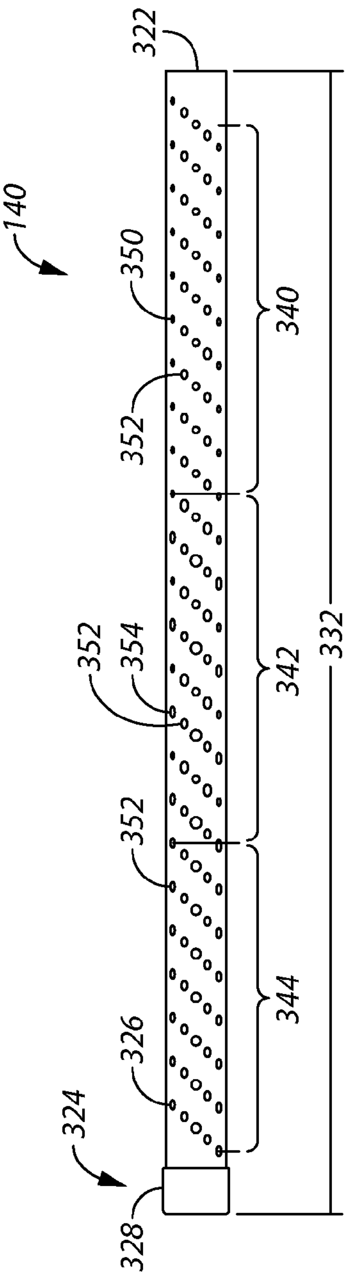
FIG. 3 shows a simplified plane view of the inner conduit of the system of FIG. 1.
Figure 4:
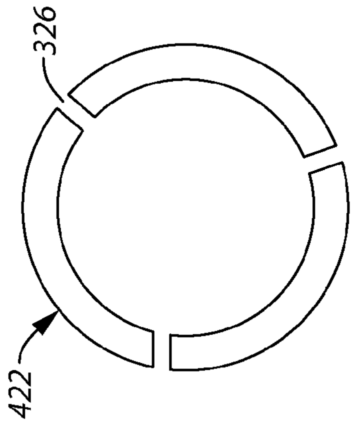
FIG. 4 depicts a simplified cross-sectional view of the conduit of FIG. 3 perpendicular to the length of the conduit.

FIG. 3 shows a simplified plane view of the inner conduit 140. FIG. 4 depicts a simplified cross-sectional view of the conduit 140 perpendicular to the length 332. Referring to FIGS. 3 and 4, the inner conduit has a first or input end 322, a second end 324, a plurality of holes or bores 326 distributed along at least a portion of the length 332 of the inner conduit 140, and an end cap 328 secured with the second end of the inner conduit. In some embodiments, the inner conduit acts as a diffuser for fuel enhanced through the system 120. The inner conduit 140 is shown as cylindrical with a circular cross-section, however, other configurations can be utilized. The inner conduit has a relatively rigid construction, but is not limited thereto. In some implementations, at least the exterior wall 422 of the inner conduit is coated with a catalyst and/or the inner conduit 140 can be formed of a catalyst, such as copper, copper alloy, nickel and other relevant catalysts and/or combinations of relevant catalysts.

The holes 326 are typically radial bores perpendicular to a longitudinal axis and axially spaced establishing communication between the interior and exterior of the inner conduit. In some embodiments the holes are round, however, the holes can have substantially any shape to achieve the desired effects as fluid is forced through the holes during operation. For example, the holes can be square, rectangular, triangular, star-shaped, elongated slots, other shapes and/or combinations of shapes. Similarly the holes can be configured with a single size, or multiple sized holes. For example a first portion 340 of the inner conduit can have holes of a first size 350 and a second size 352, a second portion 342 having holes of the second size 352 and a third size 354, and a third portion 344 with holes of just the second size 352. AS a further example, the first sized holes could have a diameter of about 0.093 inches, the second sized holes could have diameters of about 0.060 inches, and the third size holes could have diameters of about 0.078 inches, where the first, second and third portions 340, 342, 344 each have a length of about 3.6 inches and the inner conduit 140 has an inner diameter of about 0.50 to 0.60 inches. In some embodiments, the sum of the cross-sectional area of the holes is about equal to and generally less than the cross-sectional area of the interior bore or channel of the inner conduit perpendicular to the length 332.

The holes are further shown in a spiral pattern along the portion of the length 330 of the inner conduit. Other patterns can be utilized, such as diamond patters, rows, other patterns and/or combinations of patterns. For example, the holes 326 can be configured extending in a spiraling longitudinally axially spaced design or pattern. Again, the numbers and sizes of the holes can vary to achieve the desired cavitation and turbulence within the fluid being treated.

Figure 6:
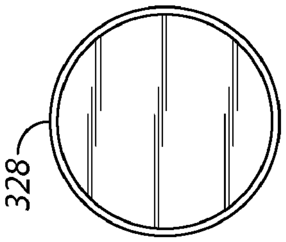
FIGS. 5-7 show a plane view, end view and cross-sectional view, respectively, of an end cap of the system of FIG. 1.
Figure 5:
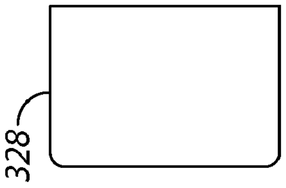
Figure 7:
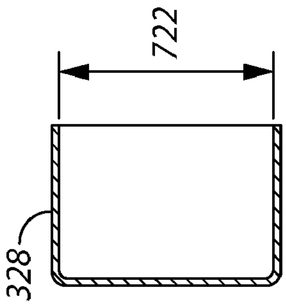
Figure 9:
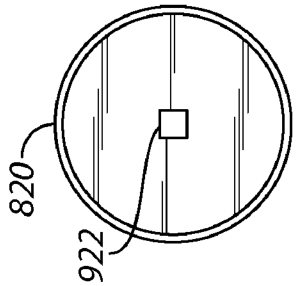
FIGS. 8-11 depict a plane view, end view, cross-sectional view, and isometric view, respectively, of an alternative embodiment of an end cap that can be incorporated into the system of FIG. 1.
Figure 11:
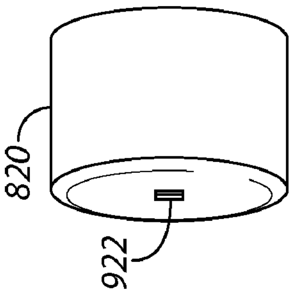
Figure 8:
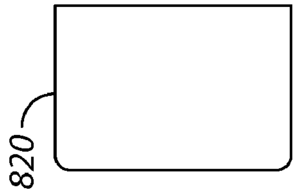

FIGS. 5-7 show a plane view, end view and cross-sectional view, respectively, of an end cap 328 according to some embodiments. The end cap has an inner diameter 722 that is about equal to or larger than an outer diameter of the inner conduit 140. The end cap 328 is secured with the second end 324 of the inner conduit 140 at least partially closing off the second end causing fluid supplied to the input 322 of the inner conduit to be agitated and forced through the plurality of holes 326 and radially away from the inner conduit. In some embodiments, the end cap completely seals the second end 324 of the inner conduit. In alternative embodiments, the end cap includes one or more bypass holes or apertures 922 (see FIG. 9) that allow a portion of the fluid supplied to the inner conduit to exit the inner conduit without having to pass through the plurality of apertures 326. The end cap can be secured with the inner conduit through screw threading, compression fit, welding, soldering, crimping, bolts, rivets, snaps, tongue and groove, and other relevant methods for securing the end cap with the inner conduit. Further according to some implementations, the end cap can be constructed of or coated with a catalyst material, such as copper, nickel, aluminum, and other relevant materials or combinations of materials.

Figure 12:
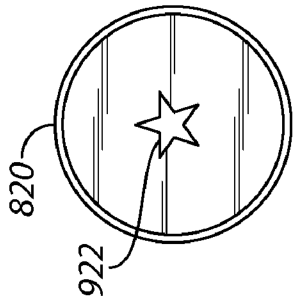
FIGS. 12-14 depict end views further alternate embodiments of the end cap of FIGS. 8-11.
Figure 13:
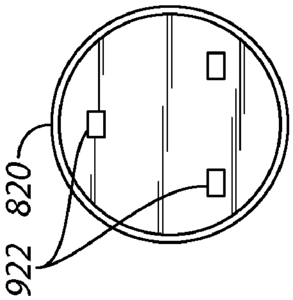
Figure 14:
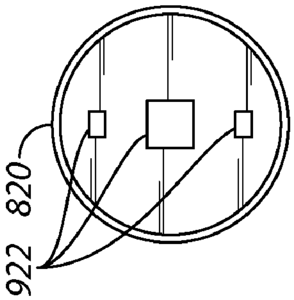

FIGS. 8-11 depict a plane view, end view, cross-sectional view, and isometric view, respectively, of an end cap 820 according to some alternative embodiments. FIGS. 12-14 depict end views of the end cap 820 with alternate configurations. Referring to FIGS. 8-14, the end cap 820 includes one or more bypass apertures 922 formed in and extending through the cap. The bypass aperture 922, at least in part, controls the reaction and/or enhancement of the fuel supplied to and flowing through the inner conduit 140. Further, the bypass aperture(s) can be square, circular, rectangular, triangular, star-shaped, or other relevant configurations and/or combinations of configurations to control the processing and/or reactions within the fuel.

The bypass aperture(s), at least in part, controls the flow of fluid and controls the treatment and/or reactions of the fluid. For example, the bypass aperture can allow some of the fluid to pass through the reaction cartridge assembly 129 generally un-reacted or untreated. By incorporating the bypass and allowing some fluid to pass through, less fluid is cavitated and imploded and/or the amount of cavitation is limited, and the level of treatment of the fluid is controlled. Additionally, the bypass aperture provides efficient acceleration of the fluid and as a result provides improved friction, implosion and cavitation of the treated fluid.

Controlling the amount of fluid that passes through the plurality of holes 326 along the inner conductor 140 further provides control over the reaction process of the fluid and thus controls the quality of the resulting treated fluid exiting the enhancement system 120. The bypass aperture 922 of the end cap 820 can, in some implementations, be configured to further control and/or reduce the pressure within the inner conduit, thus further controlling the velocity and/or pressure at which the fluid passes through the plurality of holes 326 along the inner conduit. Controlling the velocity at which the fluid exits through the plurality of holes of the inner conduit further controls the cavitation and/or the impact of the fluid with the catalytic inner surface of the outer conduit 142 providing greater control over the reaction of the fluid within the enhancement system.

The bypass aperture can be configured to allow some of the fluid to pass through the enhancement system generally untreated and/or unaltered to control a quality level of the fluid. Alternatively and/or additionally, the bypass aperture can be configured to establish some cavitation within the fluid as the fluid passes through the bypass aperture treating the fuel, but typically at a lesser extent than at least portions of the fluid passing through the plurality of holes 326 along the inner conduit, to control the quality level of the treated fluid.

Figure 10:
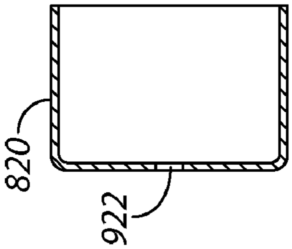

The bypass aperture 922 shown in the end view of the cap 820 in FIG. 10 has generally a square shape. It is noted, however, that other shapes and the numbers of apertures being employed can vary depending on the desired implementation, amount of cavitation if any through the bypass aperture and/or other similar conditions. For example, in some implementations, the bypass aperture can be round, oval, star shaped, rectangular, other shapes, consist of multiple holes (whether square, round, etc.), and/or combinations thereof. The size, shape and number of bypass apertures in the end cap depend on a desired fluid flow, pressure within the inner conduit, cavitation of fluid passing through the bypass aperture, cavitation of fluid passing through the plurality of holes 326 along the inner conduit and other factors. The diameter and/or area of the bypass aperture is dependent upon the implementations and/or the desired fluid flow control. Typically, the diameter and/or total cross-sectional area of the one or more bypass apertures is proportional to the diameter of the inner conduit. In some implementations, the diameter of a circular bypass aperture can range from 2 to 25 mm relative to an inner diameter of the end cap of about 0.6 inches for some applications.

Figure 15:
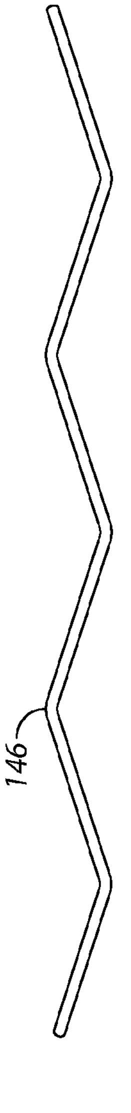
FIGS. 15 and 16 depict simplified isometric and end views, respectively, of a spacer that can be incorporated into the system of FIG. 1.
Figure 16:
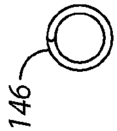

FIGS. 15 and 16 depict simplified isometric and end views, respectively, of the spacer 146. The spacer 146 is configured to be positioned about the exterior of the inner conduit 140, and in some embodiments is spirally wound around the inner conduit. The spacer, in part, maintains the positioning of the inner conduit 140 relative to the outer conduit 142. Additionally, the spacer in some implementations causes further agitation in the fluid as the fluid travels through the passage 150.

The spacer 146 can be secured with the exterior of the inner conduit 140 (or interior of the outer conduit 142) through soldering, welding, and other similar bonding techniques, pins or pegs and mating holes, compression fit, and other techniques. For example, in some implementations the spacer includes pins that extend radially inward toward the inner conduit and the inner conduit includes mating apertures that receive the pins to secure the spacer with the inner conduit. Typically, the spacer is positioned on the exterior of the inner conduit between the end cap and the input, and extends along the plurality of holes 326.

The spacer can be made of copper, a copper alloy, nickel, a nickel alloy, iron, iron coated with another metal (e.g., copper, copper alloy), aluminum and other relevant materials or combinations of materials. In some implementations, the spacer 146 is constructed of or coated with a catalyst material to aid in the reaction and enhancement of the fluid processed through the enhancement system 120. The spacer can have substantially any shaped cross-section, such as circular, rectangular, square, or other cross-sectional shapes. For example, the spacer can be formed from a wire or a rod shaped to the desired spiral configuration.

Figure 17:
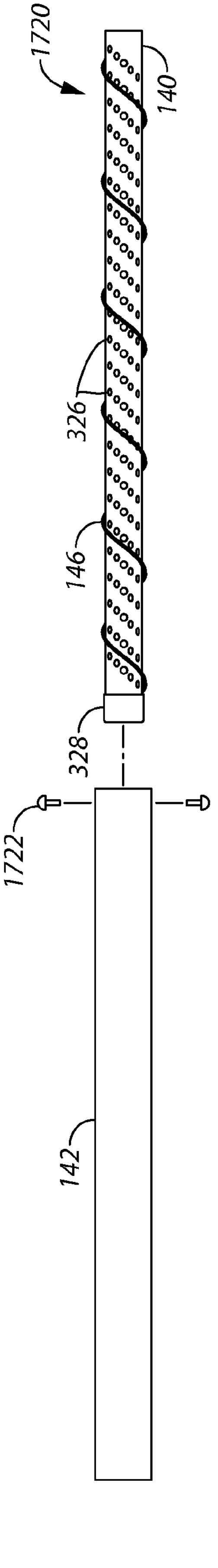
FIG. 17 shows an inner conduit assembly prior to being inserted into the outer conduit to form a reaction cartridge assembly of FIG. 1 according to some embodiments.

FIG. 17 shows an inner conduit assembly 1720 prior to being inserted into the outer conduit 142 to form a reaction cartridge assembly 126 according to some embodiments. The inner tube assembly consists of the inner conduit 140 with the plurality of holes 326, the spacer 146 spirally wound around the inner conduit, and the end cap 328 secured with the inner conduit. The diameter of the inner conduit assembly 1720 is less than the inner diameter of the outer conduit such that the inner conduit assembly is inserted into the outer conduit. The inner conduit is secured with the outer conduit through screws 1722, pins, compression fit, crimping and/or other such methods.

The outer conduit has an interior diameter that is at least equal to and typically greater than the diameter of the end cap 328 and/or spacer 146. As such, the gap or passage 150 is formed between the exterior of the inner conduit 140 and the interior of the outer conduit 142. A seal is established at the input of the inner conduit 140 with the outer conduit 142 such that as fluid is supplied to the enhancement system 120, fluid is directed into the inner conduit and does not directly enter the outer conduit but instead is directed from the inner conduit into the passage 150 between the inner conduit and the outer conduit through the plurality of holes 326. The seal can be implemented through an O-ring, gasket, or other seal.

Figure 18:
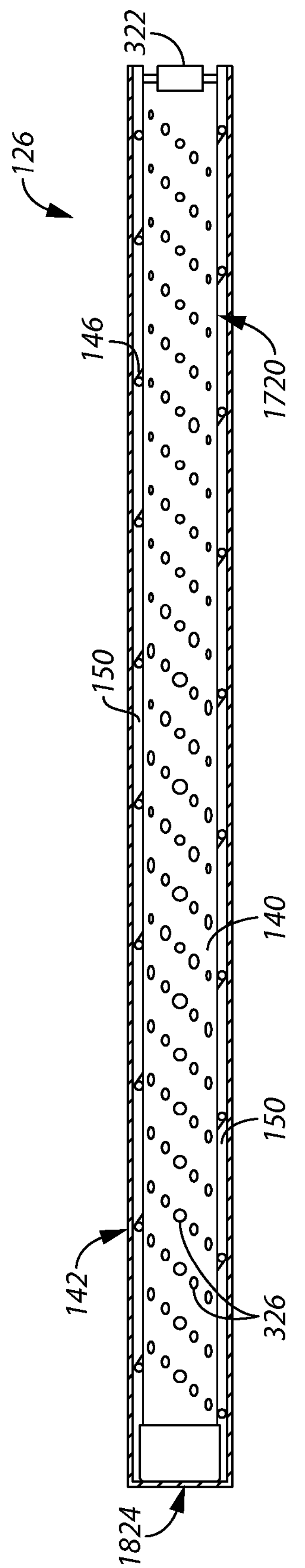
FIG. 18 depicts a simplified cross-sectional view of a reaction cartridge assembly that can be implemented in the system of FIG. 1.

FIG. 18 depicts a simplified cross-sectional view of a reaction cartridge assembly 126 as implemented according to some embodiments. The inner conduit assembly 1720 is shown axially aligned within the outer conduit 142 with the gap or passage 150 defined between at least the exterior wall of the inner conduit 140 and the interior wall of the outer conduit 142. In operation, fluid is supplied to the input 322 of the inner conduit and at least a portion of the fluid flows out the plurality of distributed holes 326 and into the passage 150 where the fluid flows to an output 1824 of the outer conduit 142 and reaction cartridge assembly 126.

Typically, the pressure within the inner conduit is at levels such that the fluid exits the plurality of apertures as streams of fluid that are directed against and/or impact the interior wall of the outer conduit 142. The rapid change in pressure as the fluid passes through the plurality of holes 326 and into the passage 150 causes cavitation within the fluid that at least induces cracking of some long carbon chain molecules. The fluid continues to contact the interior wall of the outer conduit, the exterior wall of the inner conduit 140 and the spacer 146 as the fluid travels along the passage 150. As such, some embodiments coat the interior wall of the outer conduit, the exterior wall of the inner conduit 140 and/or the spacer 146 with a catalyst material, and/or construct the outer conduit, the inner conduit 140 and/or the spacer 146 from a catalyst material. For example, the interior wall of the outer conduit 142 can be coated with a copper alloy (e.g., copper-aluminum alloy), and the inner conduit 140 and spacer 146 can be constructed from a copper alloy. Coating and/or constructing the interior wall of the outer conduit, the exterior wall of the inner conduit 140 and the spacer 146 with a catalyst material increases the exposure of the fluid to the catalyst to further aids in the process of enhancing the fluid. In some embodiments, the catalyst material releases electrons to the fluids further altering the physical characteristics of the fuels and/or in part aiding the cracking carbon chain molecules.

Referring back to FIG. 1, the reaction cartridge assembly 126 is further contained within the exterior sheath conduit 134 that provides protection for the reaction cartridge assembly and other internal components of the enhancement system 120. The exterior sheath conduit typically has a diameter that is equal to or greater than the outer diameter of the outer conduit 142, and in some embodiments is in contact with the exterior surface of the outer conduit when the fluid enhancement system 120 is assembled and/or in use. Further, the exterior sheath conduit 134 is configured to withstand predefined pressures and can be constructed of substantially any relevant material capable of carrying the fluid intended to be treated (e.g., fuel). In many instances, the exterior sheath conduit is a multi-layer hose, such as a hydraulic hose that includes one or more layers of synthetic rubber tubing, one or more braids of high wire reinforcement (e.g., tensile steel wire reinforcement), one or more metallic conduits, and/or other layers. For example, in some embodiments the exterior sheath conduit is a hydraulic hose SAE100R1AT no SKIVE rated for 1000 psi, from Parker Hannifin Corporation of Cleveland, Ohio.

The fluid enhancement system 120 can further include in some embodiments the biasing member 222, vortex 132, and input and output coupling adaptors 122, 124. The biasing member 222 in some embodiments is a spirally wound rod or spring that is positioned between the output coupling adaptor 124 and the reaction cartridge assembly 126. In some implementations, the biasing member is compressed upon insertion establishing a force against the reaction cartridge assembly to maintain positioning of the reaction cartridge assembly relative to at least the input coupling adaptor 122. The biasing member can be constructed of substantially any relevant material and in some implementations is further constructed of and/or coated with a catalyst material. For example, the biasing member can be a spring constructed of 0.125 inch copper rod alloy C11000 ASTM B187 wound in a spiral to a desired length and compressibility. The diameter of the biasing member is less than the diameter of the interior of the exterior sheath conduit. Additionally, the biasing member in some implementations causes further agitation and/or cavitation in the fluid as it is pushed through, over and/or around the bias member providing a subsequent phase of cavitation following the reaction cartridge assembly.

Some embodiments further include a vortex 132 positioned proximate the output coupling adaptor 124, and in some instances is further pressed against the output coupling adaptor by the biasing member 222. The vortex can act as a reducer maintaining a desired pressure within the enhancement system 120 and/or increase turbulence within the flowing fluid. Further, the vortex can generate a further phase of the cavitation provided through the enhancement system 120. Some embodiments additionally and/or alternatively incorporate a vortex at the input 322 to the inner conduit 140 to initiate turbulence and/or an initial phase of cavitation upon entry of the fuel into the enhancement system.

Figure 20:
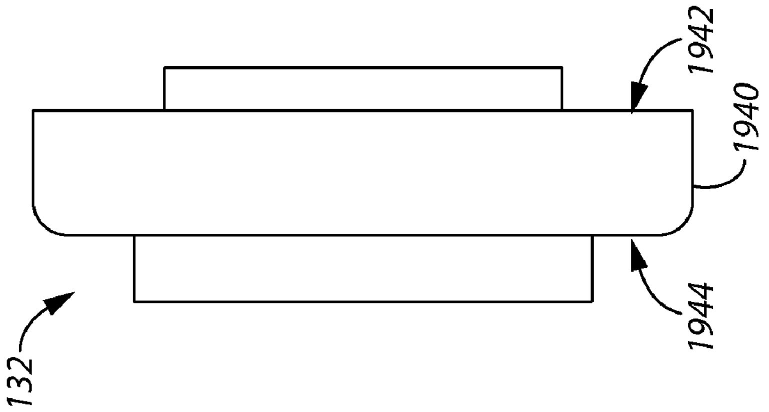
FIGS. 19 and 20 depict a side plane view and a cross-sectional view, respectively, of a vortex of the system of FIG. 1.
Figure 19:
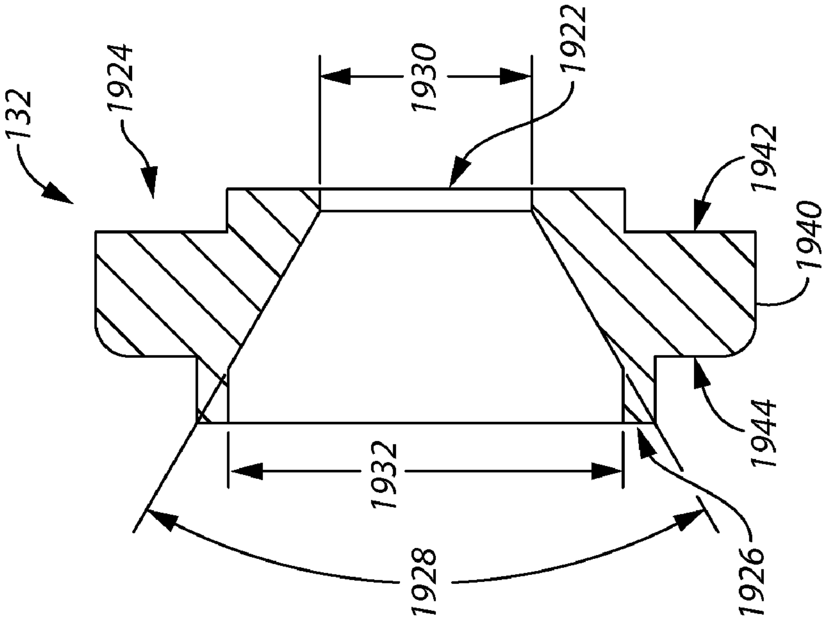

FIGS. 19 and 20 depict a side plane view and a cross-sectional view, respectively, of a vortex 132 according to some embodiments. The vortex includes a central bore 1922 that extends from a first side 1924 through the vortex to a second side 2826 such that fluid can pass through the vortex. The central bore has a first diameter 1930 at the first side and tapers to a wider diameter 1932 at the second side 1926. The angel 1928 by which the bore tapers depends on the fluid flow, the pressure and other parameters. In some embodiments, the angel 1928 at which the tapering occurs is approximately 60 degrees, however, other configurations can have different angles depending on desired effects. An annular extension or ring 1940 extends around the vortex defining a first ledge or shelf 1942 relative to the first side 1924 that is configured to cooperate with and/or abut against the biasing member 222, and a second ledge or shelf 1944 relative to the second side 1926 that is configured to cooperate with and/or abut against the output coupling adaptor 124.

The central bore 1922 can have substantially any relevant cross-sectional shape, such as but not limited to, circular, square, rectangular, oval, triangular, star shaped and/or other configurations. Additionally, the central bore can be replaced with a plurality of bores of relevant shape and/or other configurations to achieve a desired flow control and/or fluid treatment. An increase in turbulence, agitation and/or cavitation results in the fluid as the fluid passing through the central bore causing further reactions within the fluid. The vortex 132 can be constructed of metal, metal alloy, and other relevant materials, and in some embodiments is formed of and/or coated with a catalyst material such as copper, copper alloy, aluminum and other such materials or combinations of materials. For example, in some implementations, the vortex is formed of a copper alloy 145 per ASTM B301 half hard.

As introduced above, the fluid enhancement system 120 can further include a vortex near or at the input of the system and/or reaction cartridge assembly 126 to initiate additional agitation and/or cavitation within the fluid. As such, the system can include an upstream vortex positioned prior to the reaction cartridge assembly 126 for increased agitation, friction and/or cavitation.

Figure 21:
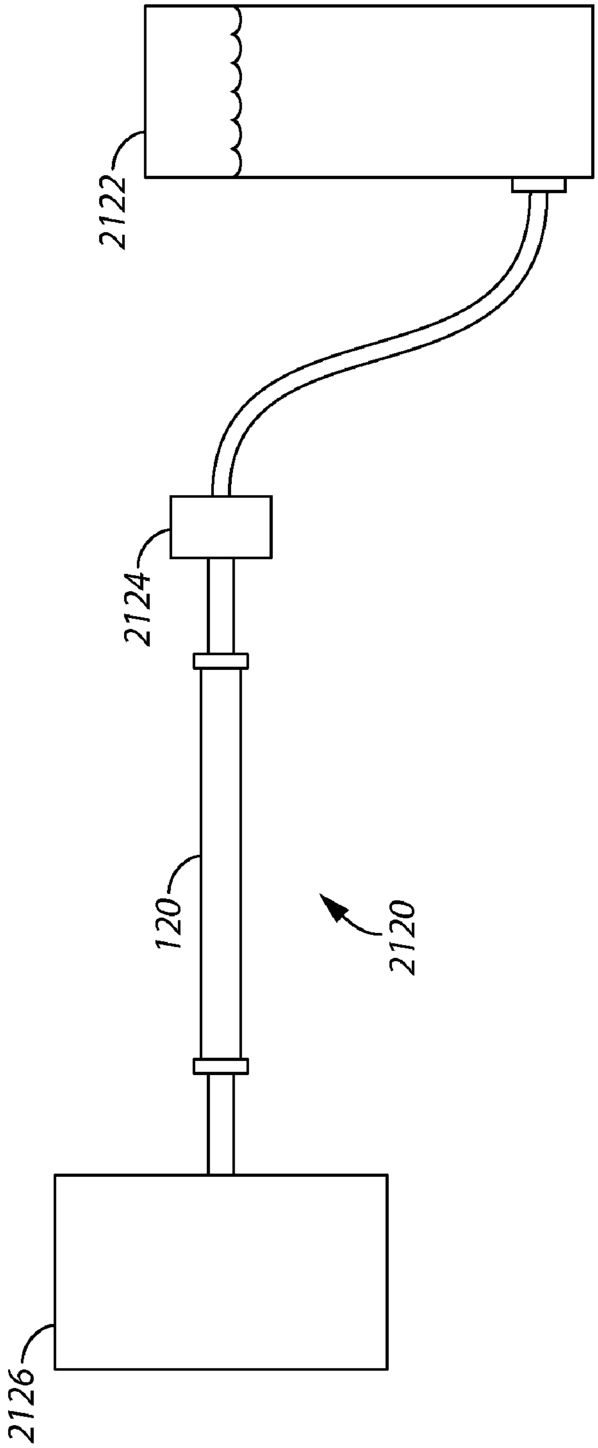
FIG. 21 depicts a simplified block diagram of a system that uses fluids that are treated or enhanced through a fluid enhancement system.

FIG. 21 depicts a simplified block diagram of a system 2120 that uses fluids that are treated or enhanced through a fluid enhancement system 120. The system includes a reservoir or tank 2122, a pump or other fluid delivery device 2124, the fluid enhancement system 120, and a fluid consumption device 2126. For example, the consumption device can be a combustion engine and the reservoir can contain fuel (e.g., diesel or gasoline) that is pumped through the enhancement system 120 prior to being delivered to the engine (e.g., delivered to a carburetor for atomization into a piston cylinder).

The fluid enhancement system, at least in part, allows for the controlled restructuring of fluids, such as fuels to a more beneficial molecular state for more optimal use and resulting performance from their use. The hydrodynamic configurations of the fluid enhancement system 120 cause vaporation and/or cavitation on approximately a microscopic scale. The vaporation and/or cavitation along with catalyst contact cause one or more of the following effects to occur with the fluid and/or fuel: the cracking of relatively long hydrocarbon chains into shorter chains; magnetic fields are induced into the fuel; and/or entrained water and impurities are released.

In operation, at least the reaction cartridge assembly 126 (see FIG. 1) initiates the formation of macroscopic bubbles in the fluid that implode into small, sub-microscopic, nano-clusters (where nano-clustesr are clusters of molecules typically ranging about from 1-100 nanometers in size). These implosions create high temperatures and high-pressures on a nano-scale. In some implementations, a magnetic field within the fluid is also formed through magneto hydrodynamics (MHD). An electromotive series can be established in some reaction cartridge assembly 126 where surrounding electromotive series negatively charges the fluid in the presence of a material catalyst. Further, the present embodiments can provide control over the flow of the fluid through the system that aids in controlling the treatment of the fluid and controlling the treatment of the fuel within the system.

The fluid enhancement system 120 in some implementations is an on-board fuel treatment center, increasing the overall quality of the fluids, such as diesel and gasoline fuels, and/or other fluids. The cracking of hydrocarbon chains into shorter hydrocarbon chains creates a more easily combustible fuel. The reaction cartridge assembly can also allow entrained water and impurities from the fuel to be freed and captured by fuel filters external to the enhancement system 120. This higher quality fuel results in improved fuel economy, lower emissions, and more power throughout the operating range of the engine.

Still referring to FIG. 21, as the fuel is pumped from the reservoir the fuel is forced into the inner conduit 140 (see FIG. 1) and streamed through the plurality of apertures such that cavitation within the fuel results causing cracking of relatively long carbon chain molecules. Further, the fuel contacts the catalytic interior wall of the outer conduit 142, exterior wall of the inner conduit, the spacer 146 and/or biasing member 222, where electrons are released from the catalyst material further altering the physical characteristics of the fuels, such as ionization, i.e., electrical charging, of a significant number of the molecules of the treated liquid or gas. The enhanced fuel is then supplied to the engine 2126 where the engine ignites the fuel with more complete combustion of the fuel supplied to the piston chamber, and further resulting in reduced emissions.

The fluid enhancement system is configured to be retrofitted into an exiting fuel line or other existing fluid consumption systems. Further, the fluid enhancement system can be incorporated directly into new engine designs, such as cooperated with the pump and/or fuel filter, or incorporated with a carburetor. The improved combustion of treated fuel further provides greater thrust, and reduced fuel consumption.

The inventors of the subject fluid enhancement system further identified that with some combustion engine systems, such as long haul diesel engines, the fuel processed through the fluid enhancement system can potentially be over treated causing excessive breakdown of the fuel and thus reducing the beneficial effects of the enhanced fuel. This adverse affect can occur in some diesel systems that recycle a portion of the fuel extracted from the tank. For example, diesel fuel is extracted from the tank passes through the enhancement system treating the fuel. With some diesel combustion systems, a portion of that fuel that was enhanced is recycled back to the tank to be later retrieved and again processed through the enhancement system. Because of the continued recycling of the fuel, portions of the fuel can be over treated and/or excessively cracked reducing the combustibility of the portion of the fuel.

Some embodiments address this over treating by controlling the treatment of fuel. These embodiments control the treatment of the fuel by bypassing a portion of the fuel out of the inner conduit such that the portion bypassed is not treated or is treated at reduced levels. As the fuel is recycled, less of the fuel is treated or fully treated so that upon re-treating less of the fuel of over treating. Therefore, the bypass allows the system to control the level treatment and thus reduce the over treating of fuel and improved fuel efficiency and combustion.

The bypass control is implemented in some embodiments through one or more bypass aperture 922 (see FIG. 9) in the end cap. By incorporating the bypass and allowing some fluid to pass through, less fluid is cavitated and imploded or cavitated at a lesser extent and the level of treatment of the fluid is controlled. The one or more bypass apertures in the end cap, in some implementations, reduce the likelihood and/or effects of clogging and/or restriction of the flow, and other problems or errors. Further in the treatment of fuel, the bypass aperture allows additional control over the treatment of fuel, such as diesel or gasoline to reduce engine ware of an engine using the treated fuel due to a lean mixture. Still further, the bypass aperture allows, in some embodiments, for a quicker and more immediate response to throttle increases, improved fuel economy, increased power and improved durability.

Figure 22:
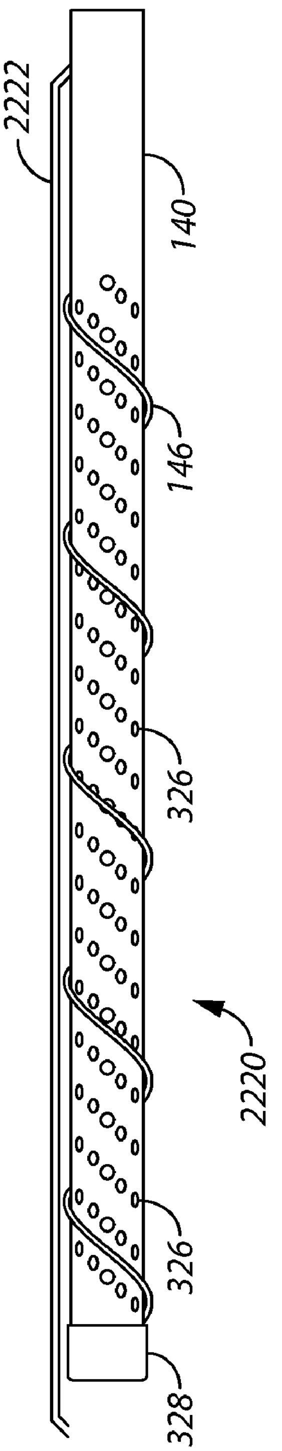
FIG. 22 depicts an alternative embodiment of a reaction cartridge assembly for use in a fluid enhancement system.

FIG. 22 depicts an alternative embodiment of a reaction cartridge assembly 2220 for use in a fluid enhancement system. The reaction cartridge assembly 2220 further includes a bypass tube or passage 2222 cooperated with in addition to the inner conduit 140, the spacer 146, and end cap 328. The bypass tube 2222 is configured with a defined diameter and positioned along, for example, the exterior of the inner conduit to allow a defined percentage of fluid to bypass at least the plurality of holes 326 to limit and/or prevent treatment of that percentage of fluid. The bypass tube can be formed of a catalytic material as described above and/or coated with a catalytic material. Still further in some embodiments, the bypass tube is used in cooperation with the end cap that includes one or more bypass apertures to control the treatment of the fluid.

Other method can be employed to provide additional and/or alternative control of the treatment of the fluid. For example, the cooperation between the inner and outer conduits at the input can be configured to allow a portion of the fluid supplied to the reaction cartridge assembly 126 to pass directly to the outer conduit 142 where that portion of the fluid is not forced through the plurality of holes 326 thus allowing control over the treatment of the fluid.

Still further, some embodiments incorporate additional catalytic material into the fluid enhancement system 120 and/or following the system. Some systems include an additional fibrous webbing, array or matting of catalytic material, such as copper, aluminum, copper-aluminum alloy, other alloys and/or other relevant materials between the reaction cartridge assembly 126 and the vortex 132 or in other areas. The fibrous matting exposes a large amount of surface area of one or more catalyst materials to fluid passing through and/or around the matting. By increasing the interaction of the fluid with the catalyst, some embodiments further enhance the reactions within the fluid and improve the treatment of the fluid. Some embodiments further increase the number of windings of the biasing member 222 and/or implement alternate configurations to further increase surface area that is exposed to fluid traveling through the system.

Some systems further increase the amount of catalyst that interacts with the fluid by incorporating a delivery tube between the fluid enhancement system and a fluid destination (e.g., an engine). The delivery tube can include an interior lining or coating constructed from one or more catalyst materials, such as copper, aluminum, or copper alloy and/or other materials. The fluid exiting the enhancement system is further treated through the exposure to additional catalyst in the delivery tube.

As such, the fluid enhancement systems of the present embodiments enhance the properties of fuel and other fluids through multi-phase cavitation. Further, the enhanced and/or altered fuel can be burned with reduced emissions and carbon deposits within an engine while also increasing engine power output and thus providing better engine efficient and reducing fuel consumption.

For example, combustion reactions within a diesel engine is the result of the combustion of a hydrocarbon, oxygen and an initial input of energy yielding water, carbon dioxide and a positive net heat reaction value. The heat value is converted to power in an engine through the pressure of the thermal expiation against a piston. Typically, in order for the hydrocarbon and oxygen to combine, the hydrocarbon should exist in a vapor state. The heat of the reaction in the combustion chamber is often high enough to vaporize the majority of incoming fuel. As the quality of the fuel degrades (e.g., longer carbon chain structures) the amount of the hydrocarbon converted to vapor diminishes, resulting in unburned hydrocarbons produced as emissions.

Treating fuel through the fluid enhancement system of the present embodiments provide in part for greater vaporization and thus greater combustion, increased power output and reduced emissions. For example, the present embodiments enhance diesel fuel by changing the properties of the fuel to a higher more reactive fuel through a change in vapor pressure from decane to heptane. This affects the activated combustion and increases the energy within the fuel. Further, this raises the Reid Vapor Pressure and greatly affects the activated combustion resulting in an increase of energy from the reaction and allows a more efficient combustion.

The fluid enhancement system of the present embodiments can be configured in substantially any size for many different applications, such as being incorporated with many different types of engines for use in treating fuel. The fuel enhancement systems of the present embodiments may be further understood in view of co-pending U.S. patent application Ser. No. 11/140,474, filed May 27, 2005, to Eriksson et al., entitled METHOD AND APPARATUS FOR USE IN ENHANCING FUELS, incorporated herein by reference in its entirety, and U.S. Pat. Nos. 5,482,629 and 6,106,782, each of which is incorporated herein by reference in their entirety.

While the invention herein disclosed has been described by means of specific embodiments and applications thereof, numerous modifications and variations could be made thereto by those skilled in the art without departing from the scope of the invention set forth in the claims.

What is claimed is:

1. An apparatus for use in treating fuel, comprising:

an input to receive the fluid;

an output through which the fluid exits;

a first conduit having an input end, an output end, and a metallic interior surface where the input end is positioned proximate the input;

a second conduit positioned within and axially aligned with the first conduit, the second conduit having first and second ends where the first end of the second conduit is positioned proximate the input and the first end is configured to receive the fluid entering through the input such that fluid enters the second conduit through the first end, and a plurality of holes distributed along at least a portion of a length of the second conduit, wherein each of the plurality of holes has a cross-sectional area generally perpendicular to fluid flow through the plurality of holes, and a sum of all of the areas of the plurality of holes is less than a cross-sectional area of an interior channel of the second conduit perpendicular to the length of the second conduit;

a treatment control bypass affixed with the second conduit configured to control an amount of fluid flow exiting the second conduit through the plurality of holes distributed along the portion of the length of the second conduit; and a vortex device positioned proximate the output end of the first conduit between the output end of the first conduit and the output, where the vortex device has a bore having a width less than an interior width of the second conduit such that the fluid passes through the bore to exit through the output adaptor.

2. The apparatus of claim 1, further comprising:

an end cap secured with the second end of the second conduit comprising the treatment control bypass including a bypass aperture formed within the end cap such that a portion of the fluid supplied to the second conduit passes through the bypass aperture exiting the second conduit.

3. The apparatus of claim 2, wherein the treatment control bypass comprises a plurality of bypass apertures formed within the end cap where a summation of cross sectional areas of the plurality of bypass apertures is proportional on a diameter of the second conduit.

4. The apparatus of claim 1, wherein the treatment control bypass comprises a bypass tube affixed at a first end to a bypass aperture of the second conduit proximate the first end of the second conduit and the bypass tube having a length extending along an exterior of the second conduit.

5. The apparatus of claim 4, wherein a second end of the bypass tube extends beyond the second end of the second conduit.

6. The apparatus of claim 1, further comprising:

a biasing member positioned between the vortex device and the output end of the first conduit such that the first and second conduits are maintained in a position proximate the input and separated from the vortex device and the output such that the fluid exiting the output end of the first conduit passes about the biasing member, through the bore of the vortex device and exits through the output.

7. The apparatus of claim 6, wherein the biasing member comprises a catalyst.

8. The apparatus of claim 6, wherein the bore of the vortex device tapers from a perimeter width to the width that is less than the interior width of the second conduit.

9. The apparatus of claim 1, wherein:

the input comprises an input adaptor configured to couple with a source of fluid to receive the fluid;

the output comprises an output adaptor through which the fluid exits, where the output adaptor is configured to couple with a subsequent device in a fluid flow such that the exiting fluid enters the subsequent device;

an exterior conduit secured with and extending between the input adaptor and the output adaptor such that the first and second conduits and the vortex device are positioned and sealed within the exterior conduit; and a biasing member positioned between the vortex device and the first and second conduits maintaining a positioning of the vortex device relative to the output adaptor, and maintaining the positioning of the first and second conduits relative to the input adaptor.

10. The apparatus of claim 9, wherein the vortex device comprises an annular extension extending about the vortex device defining a first ledge in the first side of the vortex device and a second ledge in the second side of the vortex device, where the first ledge is configured to cooperate with the biasing member and the second ledge is configured to cooperate with the output coupling adaptor.

11. The apparatus of claim 9, wherein the bore of the vortex device tapers from a perimeter width to the width that is less than the interior width of the second conduit, and an angle by which the bore tapers is dependent on fluid flow through the bore and pressure within the exterior conduit.

12. A method for use in treating fuel, comprising:

delivering a fluid under pressure to a first conduit;

forcing a first portion of the fluid out of the first conduit through a plurality apertures distributed along a length of the first conduit forming streams of fluid;

causing the streams of fluid to impact an interior metallic wall of a second conduit that is axially aligned with and positioned about the first conduit treating the fluid to alter physical characteristics of the first portion of the fluid producing treated fluid; and controlling the treating of the fluid comprising:

directing a second portion of the fluid out of the first conduit bypassing the plurality of distributed apertures producing bypassed fluid such that the bypassed fluid is treated at most at reduced levels relative to the treated fluid; and combining the treated fluid and the bypassed fluid;

recycling a portion of the combined treated fluid and bypassed fluid that is less than the fluid delivered to the first conduit to be again delivered under pressure to the first conduit; and controlling the bypassing such that the second portion of the fluid is dependent on pressure within the first conduit, cavitation of fluid passing through the plurality apertures distributed along the length of the first conduit and the recycled portion of the combined treated fluid and bypassed fluid.

13. The method of claim 12, wherein the controlling the treatment of the fluid comprises diverting the second portion of the fluid through a bypass tube that extends at least to an output end of the first conduit.

14. The method of claim 12, further comprising:

further agitating the fluid following the forcing of the first portion of the fluid out of the first conduit through the plurality apertures causing a subsequent phase of cavitation.

15. The method of claim 14, further comprising:

exposing the second portion of the fluid to a catalyst and altering the physical characteristics of the second portion of the fluid.

16. The method of claim 12, further comprising:

agitating the fluid prior to the first conduit causing an initial phase of cavitation.

* * * * *